United States Patent
Schoeppe et al.

(10) Patent No.: US 6,665,068 B1
(45) Date of Patent: Dec. 16, 2003

(54) ARRANGEMENT FOR WAVELENGTH-DEPENDENT ADJUSTMENT OF LIGHT BEAM

(75) Inventors: Guenter Schoeppe, Kunitz (DE); Stefan Wilhelm, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 282 days.

(21) Appl. No.: 09/687,124

(22) Filed: Oct. 13, 2000

(30) Foreign Application Priority Data

Oct. 15, 1999 (DE) .......................... 199 50 692

(51) Int. Cl.[7] ................................. G01J 3/02
(52) U.S. Cl. .................. 356/310; 356/300; 359/368
(58) Field of Search .................. 356/300, 310, 356/326, 328, 330, 331; 359/368

(56) References Cited

U.S. PATENT DOCUMENTS

| | | | | |
|---|---|---|---|---|
| 3,586,442 A | * | 6/1971 | Tripp | 356/331 |
| 3,907,430 A | * | 9/1975 | Mann | 356/332 |
| 4,660,975 A | * | 4/1987 | Aughton | 356/308 |
| 4,790,654 A | * | 12/1988 | Clarke | 356/310 |
| 5,305,083 A | * | 4/1994 | Marianik et al. | 356/330 |
| 6,166,385 A | * | 12/2000 | Webb et al. | 356/328 |
| 6,177,992 B1 | * | 1/2001 | Braun et al. | 250/458.1 |

FOREIGN PATENT DOCUMENTS

SU 987406 * 1/1983 ............. G01J/3/18

\* cited by examiner

Primary Examiner—F. L. Evans
Assistant Examiner—Kara Geisel
(74) Attorney, Agent, or Firm—Reed Smith LLP

(57) ABSTRACT

An arrangement for wavelength-dependent adjustment of light beam, preferably laser radiation of different wavelengths, preferably in a laser scanning microscope, wherein the light beam is split by a dispersive element and reaches a concave mirror, and an adjustable device for at least partially cutting out individual wavelengths or wavelength ranges of the incident and/or reflected beam is located in front of the concave mirror.

8 Claims, 3 Drawing Sheets

FIG. 3. Mirror arrangement for rotation of polarization plane

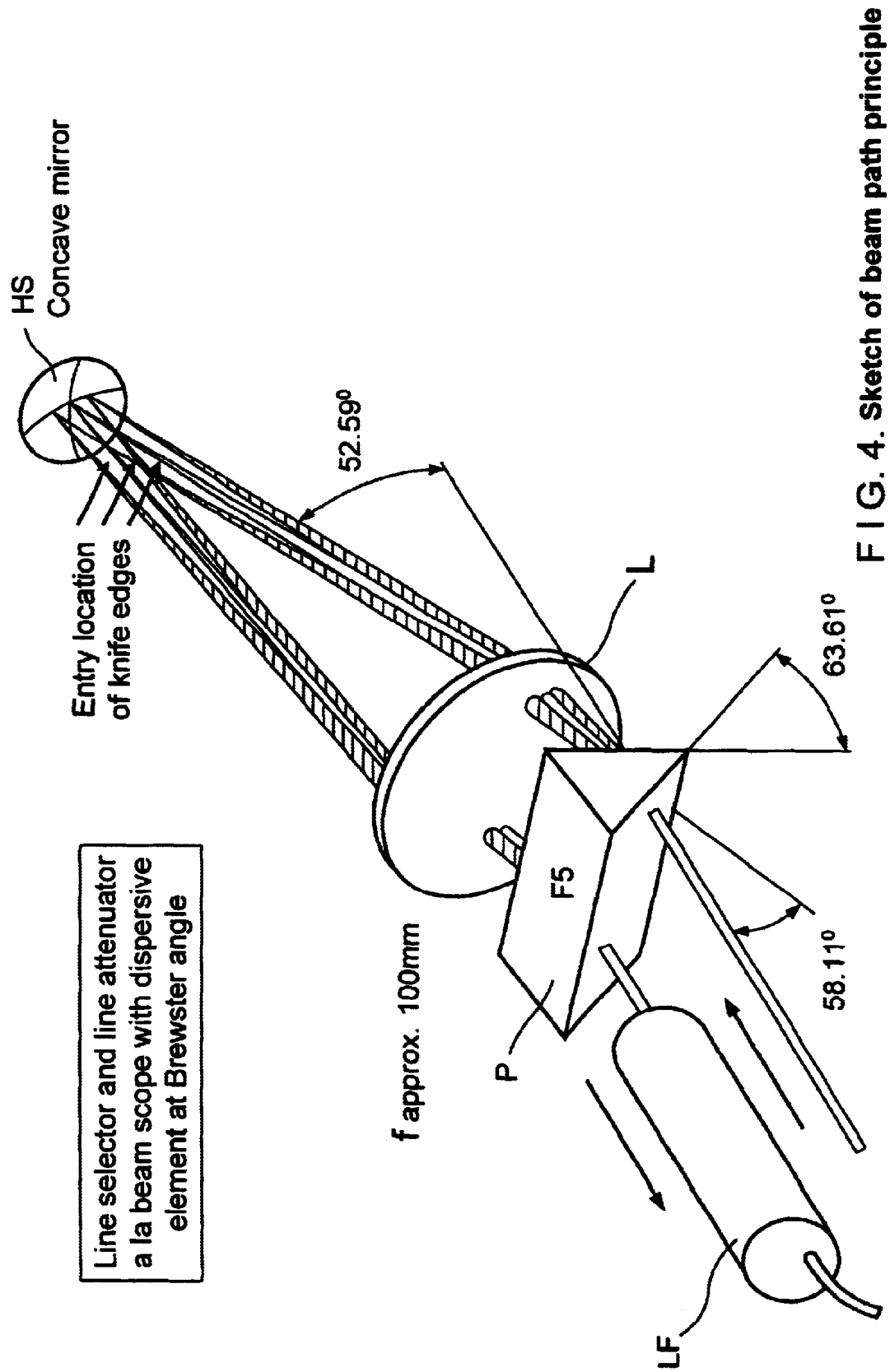
FIG. 4. Sketch of beam path principle

ARRANGEMENT FOR WAVELENGTH-DEPENDENT ADJUSTMENT OF LIGHT BEAM

BACKGROUND OF THE INVENTION

There is a need to provide an economical possibility for deliberate attenuation of determined wavelengths in a wavelength mixture of a $TEM_{00}$ laser beam while maintaining beam quality and relinquishing velocity.

An effective possibility for meeting this need consists in that the laser beam is split spectrally by a dispersive element, spots are generated by a lens from the various wavelengths on a concave mirror, the beam is sent back again through the lens and dispersive element so as to be deflected at a small angle, and a polarization-preserving single-mode light-conducting fiber is arranged behind the dispersive element.

In the vicinity of the spots, individual knife edges are inserted into the beam path of the different wavelengths. These knife edges can be displaced individually and in a specific manner so that the beam can be continuously attenuated in a wavelength-selective manner and with theoretically infinitely small steps.

The movement of the knife edges can be carried out, for example, via cams and levers by stepper motors or piezoelectric bending strips.

The diffraction at the knife edges changes the beam profile. This beam profile is cleaned up again by coupling into a single-mode fiber, so that a more or less attenuated laser beam with $TEM_{00}$ quality is present at the fiber output.

It is further advantageous that the dispersive element is constructed as a prism and the entrance faces and exit faces of the prism are arranged in the polarized laser beam at the Brewster angle to prevent reflection losses.

Because of the usual orientation of the polarization plane, it is advantageous to rotate it by 90° by means of a suitable arrangement of two mirrors in order to achieve a small overall height of this arrangement and, therefore, optimum stability.

BRIEF DESCRIPTION OF THE DRAWINGS

In the drawings:

FIG. 1 shows a construction in accordance with the invention in

FIG. 1 shows a construction in accordance with the invention in modified schematic form;

FIG. 3 is a schematic representation of a mirror arrangement for rotation of polarization plane; and FIG. 4 is a pictorial sketch of the beam path principle in one example of the invention.

DESCRIPTION OF THE PREFERRED EMBODIMENTS

Figure 1:
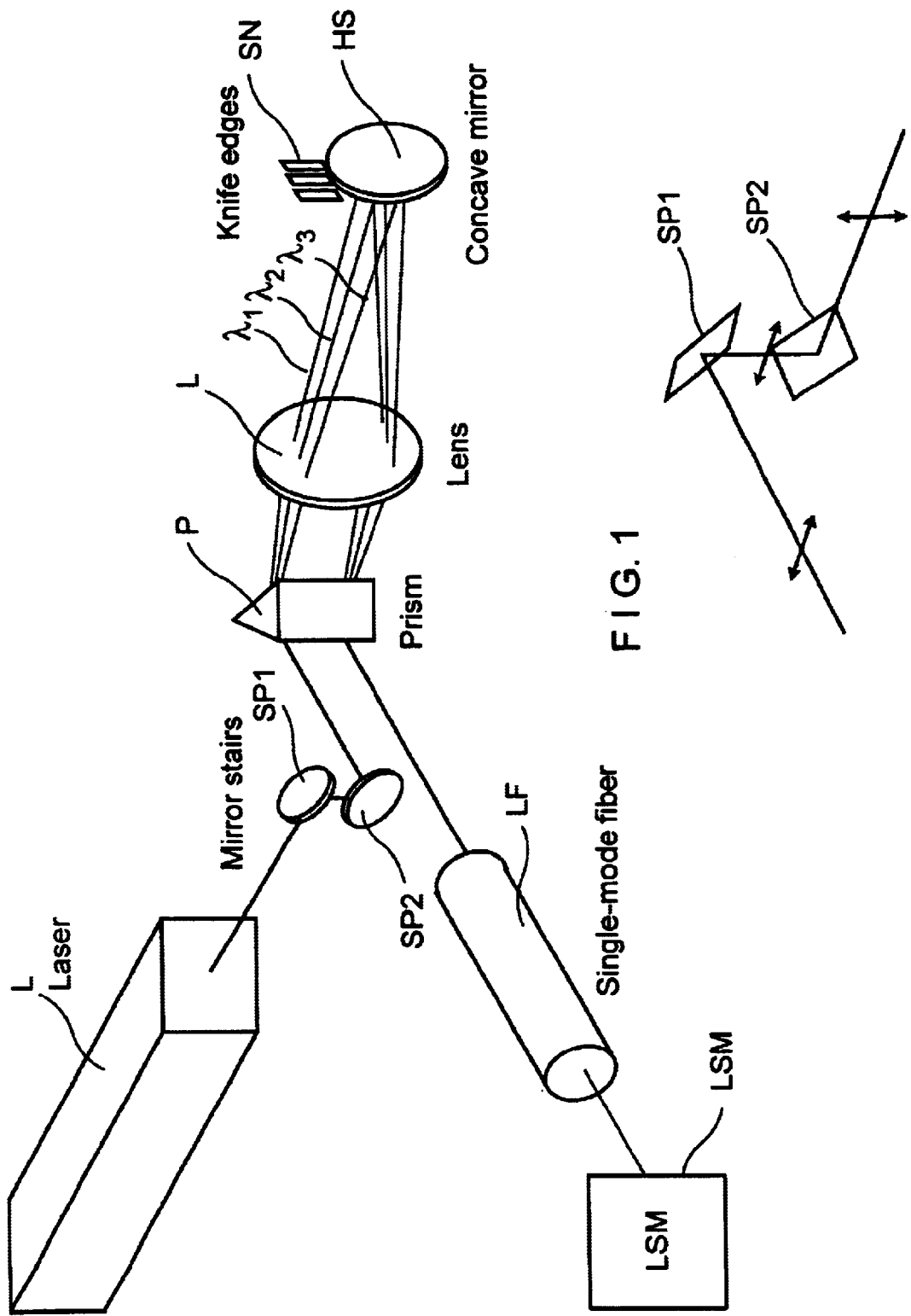
Figure 2:
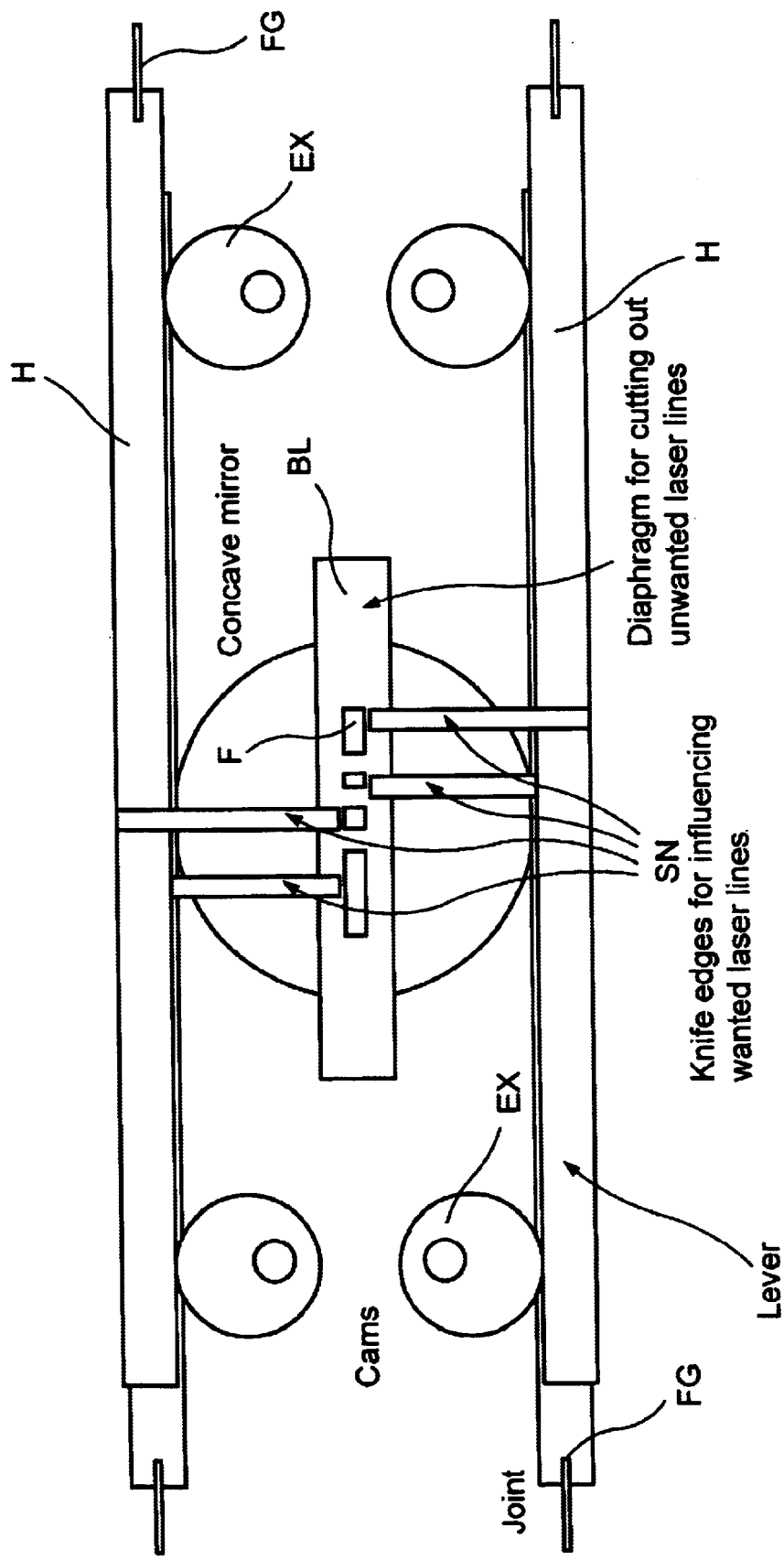
FIG. 2 illustrates specific details of the construction of FIG. 1, again in modified schematic form.

FIG. 1 shows a construction according to the invention. The collimated light of a multiline laser L or a plurality of lasers superimposed via beam combiners reaches a prism P via mirror stairs comprising mirrors SP1 and SP2 and is split by the prism P into individual wavelength regions designated, for example, by λ1λ2λ3 and is imaged by a lens L as a light spot on a spherical concave mirror HS. This mirror HS reflects spectral components which are collimated again by the lens L and combined via the prism and arrive in a light-conducting fiber LF with input coupling optics, not shown, and by way of the latter reach the illumination beam path of a microscope, preferably a laser scanning microscope such as that in DE . . . A fixed diaphragm BL and movable knife edges are arranged in front of the concave mirror HS. This is shown in detail in FIG. 2.

The knife edges SN are coupled with levers H which are fastened to one side of a spring joint and accordingly execute a vertical movement when the cams EX rotate, as a result of which the window openings F in the diaphragm BL can be completely or partially closed.

The diaphragm BL itself serves to cut out unwanted laser lines and is advantageously fixedly arranged in such a way that it covers the components which reach the mirror HS and are reflected by the latter.

Depending on an arrangement at the bottom or at the top, the arriving or departing beam components are covered by the knife edges SN, i.e., in the present example, the top knife edges cover the arriving beams and the bottom knife edges cover the reflected beams.

The levers H can also be arranged so as to be displaceable in the direction of dispersion and accordingly enable a change in the cut out wavelengths.

The mirror stairs comprising mirrors SP1, SP2, serve to rotate the polarization direction as shown in FIG. 3, from the horizontal at the laser output to the vertical at the prism.

When light enters the prism in this polarization state and at Brewster angle, no unwanted reflection occurs in effect.

It is shown by way of example in FIG. 4 that the light enters at an angle of 58.11 degrees to the incident normal in glass type F5 and, in order to generate a symmetric passage, i.e., a middle wavelength, has the same entrance and exit angle. The wedge angle must be 63.61 degrees.

The symmetric passage ensures that the Brewster angle is met also at the rear of the prism and accordingly no unwanted reflection occurs at that location.

Arrangements in which the principle mentioned above is reversed are also possible, wherein (possibly with the omission of the mirror stairs) the light from the above-mentioned fiber, more or less as a light source, travels via the prism and concave mirror to the laser as detector and determined detection wavelengths can be cut out by the strips SN.

While the foregoing description represents the present invention, it will be obvious to those skilled in the art that various changes may be made therein without departing from the true spirit and scope of the invention.

What is claimed is:

1. An arrangement for wavelength-dependent adjustment of a light beam in a laser scanning microscope, including laser radiation of different wavelengths, comprising:

a dispersive element for splitting the light beam, said split light beam reaching a concave mirror; and an adjustable device for at least partially cutting out individual wavelengths or wavelength ranges of the incident and/or reflected beam being located in front of the concave mirror a light conducting-fiber connected to a laser scanning microscope for in-coupling the light beam to the laser scanning microscope.

2. The arrangement according to claim 1 wherein the radiation reflected by the concave mirror is combined spectrally via the dispersive element and is coupled into the light-conducting fiber.

3. The arrangement according to claim 2, wherein the light-conducting fiber is a single-mode fiber.

4. The arrangement according to claim 1, wherein the laser light reaches the dispersive element by way of a device for changing the polarization direction.

5. The arrangement according to claim 1, wherein the dispersive element is a prism.

6. The arrangement according to claim 5, wherein a light radiation input coupling at Brewster angle is coupled into the prism.

7. An arrangement for wavelength-dependent attenuation and adjustment of a laser beam sent to a laser scanning microscope, including laser radiation of different wavelengths, comprising:

a set of mirror stairs which rotate the polarization of a laser beam incident on a dispersive prism element for creating a split laser beam of individual laser line wavelengths;

wherein the dispersive element is structured with entrance and exit faces arranged at the proper angles to the laser beam incident on the dispersive element for the laser beam to be incident at the Brewster angles on the dispersive prism element so that no unwanted reflection occurs in the dispersive prism element, a lens for focusing the split laser beam output from the dispersive element and for directing the split laser beam to a concave mirror;

a continuously adjustable device located in front of the concave mirror and having individually displaceable mechanical knife edges for at least partially cutting out individual wavelengths or wavelength ranges of the split incident laser beam and a reflected laser beam to result in a wavelength selective continuously attenuated and adjustable outputted laser beam;

the outputted laser beam being redirected through the lens which collimates the outputted laser beam and which also redirects the outputted laser beam through the dispersive prism element;

a laser conducting fiber for receiving the outputted laser beam from the dispersive prism element, wherein the laser conducting fiber provides a polarization preserved transverse mode $TEM_{00}$ laser beam to the laser scanning microscope.

8. The arrangement according to claim 7, wherein the laser-conducting fiber is a single-mode fiber.

* * * * *